United States Patent [19]
Schiwek

[11] Patent Number: 5,690,715
[45] Date of Patent: Nov. 25, 1997

[54] GLASS FIBER MANUFACTURING PROCESS AND PLANT

[76] Inventor: Helmut Schiwek, Am Waldessaum 7, Duisburg D-47057, Germany

[21] Appl. No.: 495,472

[22] PCT Filed: Jan. 7, 1994

[86] PCT No.: PCT/DE94/00007

§ 371 Date: Jul. 24, 1995

§ 102(e) Date: Jul. 24, 1995

[87] PCT Pub. No.: WO94/17004

PCT Pub. Date: Aug. 4, 1994

[30] Foreign Application Priority Data

| Jan. 23, 1993 | [DE] | Germany | 43 01 837.8 |
| Jan. 23, 1993 | [DE] | Germany | 43 01 842.4 |
| Jul. 24, 1993 | [DE] | Germany | 43 24 897.7 |
| Jul. 28, 1993 | [DE] | Germany | 43 25 267.2 |

[51] Int. Cl.$^6$ .................... C03B 37/04; C03C 25/02
[52] U.S. Cl. ................... 65/448; 65/443; 65/469; 65/470; 65/522; 65/529
[58] Field of Search .............. 65/443, 444, 447, 65/448, 529, 469, 516, 470, 521, 522; 118/300, 325

[56] References Cited

U.S. PATENT DOCUMENTS 3,762,896  10/1973  Borst ..................... 65/447 X
5,006,140   4/1991  Loercks et al.
5,100,450   3/1992  Cunningham ............ 65/447

FOREIGN PATENT DOCUMENTS 41 40 247  12/1992  Germany.

Primary Examiner—Melvin Mayes
Attorney, Agent, or Firm—James Creighton Wray

[57] ABSTRACT

In a process for producing insulating materials with environmentally safe binding components, a long-chain starch is used as binder, besides silicone. The starch is heated up to 50° to 60° C., held at this temperature and sprayed on the glass fibers separately from the silicone; 6 to 8% binder, consisting of starch and silicone, are used, then a spun-glass mat or slab may be shaped and dried at about 180° C. A spun-glass mat (16), insulating mat or slab or adsorber is thus obtained which surprisingly is water-proofed and held together exclusively by starch, resin and silicone, which may be used without any problems and has a uniform bulk density throughout. In the plant (1) provided for that purpose, supply rings for water (9), for starch (10) and for silicone (11) are provided. The nozzles (13) for the supply ring 10 have a larger opening and separation edges. The premixing container (17) and the supply pipe (15) are heatable or heat-insulated. In a further embodiment, an emulsion is formed from silicone resin, silicone oil, a dust binder and the starch, is atomized at 18° to 200° C. and sprayed onto the passing stream of glass fibers.

10 Claims, 3 Drawing Sheets

GLASS FIBER MANUFACTURING PROCESS AND PLANT

BACKGROUND OF THE INVENTION

The invention relates to a process for manufacturing glass fibers from sand, recycled glass, and additives, which are, after having been melted into liquid glass, pressed through a number of openings in a turn table, whereupon the glass fibers which are still hot are sprayed with water and then with a binder, in order to then be shaped under pressure into a mat or similar shape. The invention also relates to a plant for performing the process, having a liquid glass container with an outlet opening, a turn table with openings, gas burners, as well as feed rings followed by nozzles for the water and the binder, and a premixing container for the binder.

During the manufacturing of glass fibers, the liquid glass is pressed through the openings of a turn table which hereby revolves at a high speed. The correspondingly fine glass fibers are then rinsed off with water and sprayed with a binder, so that the individual glass fibers then can be put together into mats or rolls, and even remain in this shape after leaving the drying oven. It is hereby known that a binder consisting essentially of phenol resin and silicone is used, whereby the end products then have an intensive yellow color due to the resin. The disadvantage hereby is that the resin is able to partially escape during the later processing or during its use as an insulator, thus creating environmental problems. Another disadvantage is that the binder effect is either completely or partially eliminated if water penetrates. European Patent 129 227 introduces a binder consisting of starch, to which other substances, such as e.g. silicone, are mixed. This product is used as a binder for paper, insulating material, plastic, textiles, etc. U.S. Pat. No. 5,006,140 finally introduces the spraying of the binder, first with water and then with a binder mixture of starch and silicone. Apparently the process here was the same as for phenol resin, i.e. 4 to 4.5% binder was sprayed onto the glass fibers. This yields a white glass fiber mat which can be rolled up and processed, but which has areas where it collapses partially or completely and which in particular do not have volume densities above 18 to 20 kg/m$^3$. The liquid starch which is sprayed with the silicone onto the glass fibers tends to form lumps, thus making a spraying through the nozzles more difficult. And finally, after medium standing times, separations occur, so that the binder mixture then cannot be used at all anymore.

SUMMARY OF THE INVENTION

The invention is based on the objective of creating a process and a plant with which phenol-free glass wool can be produced safely, cheaply, and continuously with practically any volume density.

According to the invention, this objective is attained in that the binder is used in the form of a mixture of starch (polysaccharides) and silicone in an amount from 6 to 8%, that a long-chain starch is used as a starch which is first heated to 50° to 60° C., and is kept at this temperature and stirred until it is sprayed, whereby starch and silicone are sprayed onto the glass fibers simultaneously, but through separate nozzles.

The long-chain starch results in an advantageous, uniformly bound and bonded glass fiber mixture so that very uniform mats and plates can be produced. In spite of the long-chain starch being used, no problems with obstructed lines and nozzles occur, but rather it is possible to keep the starch so liquid that it can be sprayed without problems onto the glass fibers. Since starch and silicone are sprayed through separate devices onto the glass fibers, no standing time problems can occur, whereby it is also possible to advantageously ensure that exactly the right parts of starch and silicone are always being used for the entire charge. When using the intended 6 to 8% of binder related to the glass wool, it is possible that the entire amount of the glass wool or glass fibers is covered in such a way as to simultaneously ensure the desired hydrophobia. The optimum is reached when 6.5% binder is used. In this way, plates with a volume density of 100 kg per cubic meter and more can be ensured. It is useful that during transport, the starch is also heated until it reaches the spray nozzles, whereby it is always ensured that a liquid with a uniform viscosity reaches the outlet of the spray nozzles. In this way, blockages and drips are safely avoided.

An especially stable mat or plate of glass fibers to be used as an insulator can be produced if starch and silicone are added in a ratio of 94 to 96% starch and 6 to 4% silicone as a binder in an amount of 6.5%. The starch (94 to 96% dry) must first be dissolved with a proper amount of water, i.e. must be boiled, thus advantageously providing a properly hot liquid which is kept and processed in this state or is heated accordingly before being added.

In order to facilitate the use of the insulator, especially in the form of plates, and in particular for plates with a low volume density, the invention provides that a thin glass fleece or bands woven from glass fibers are applied, preferably glued, to the glass fiber mat on several or all sides. This glass fleece or the bands provide the mats with special structural stability without negatively influencing their effects, in particular their adsorber effects. The glass fleece or the bands facilitate both the storage and later processing of the mats produced in this way.

It is provided for, that prior to the spraying on of the binder onto the glass fibers made from recycled glass, from which all foreign substances have been removed and which has been crushed without being separated according to color or otherwise, and along with other additives is heated to 800 to 1000 C., the liquid glass is melted and then processed into the glass fibers. In this process the recycled glass portion can be varied, in that the proportion of the binder is increased with the increase of recycled glass. This is an important step with respect to the environment, since until now it has not been possible, to recycle all of the utilized recycled glass volume to 100%. Especially advantageous in this regard is, that from such recycled material a high-grade product can be produced, which furthermore guarantees high utility life and therefore will not become a waste product in the foreseeable future. This material can even be recycled.

For performing the process, a plant is used which has a liquid glass container with an outlet opening, a turn table with openings, gas burners, as well as feed rings followed by nozzles for the water and binder, and a premixing container for the binder, whereby one feed ring is provided for the starch or resin, and an additional feed ring for the silicone, whereby the feed ring for the starch is followed by nozzles with enlarged nozzle openings and tear-off edges, and whereby the premixing container is heatable and the feed lines to the nozzles are constructed at least so as to be heat-insulating. As in the past, such a plant allows the production of a glass wool from the jet of the liquid glass, whereby said glass wool is sprayed with water and is cooled, and is then sprayed with the binder components, at approximately the same time, from the feed rings for the binder components silicone and starch or resin, which are located closely behind each other. A perfect spraying and, in particular, a spraying which does not interfere with the operation, is hereby achieved in that nozzles with enlarged opening and a preheated premixing container are used for the starch. It would also be conceivable here that the nozzle openings are shaped in such a way that an obstruction of the nozzles is prevented even if unintended, small lumps in the starch are fed through. The tear-off edges prevent the formation of unfavorable product drips, which may form disadvantageous nests in the later end product. Overall, this creates a plant which can be used safely for continuous operation, while preventing production problems, but in particular a uniform glass wool is produced, which can be processed into plates or mats as desired.

With an appropriate pump performance, it may be advantageous that a sieve with openings adapted to the nozzles is arranged between the premixing container and feed line, and that a hydrometer is provided in the feed line, just before the feed ring. The pump pressure would then press any lumps still present in the starch through the sieve and would at the same time break them up so that they could then be transported through the nozzles. With the hydrometer, it can be continuously determined whether an optimal starch liquid is available, so that the heating temperature is increased, if required, and other measures are employed in order to adjust the viscosity of the starch solution.

If, for technical reasons, the binder of phenol resin and silicone as used in the past or another resin are also used in addition to the binder of starch and silicone, this can be easily accomplished in that the turn table is associated with another feed ring for the binder of resin (vinyl resin or epoxy resin), which is equipped with nozzles having a smaller outlet cross-section than outlet cross-sections of the nozzles of the other feed ring. It should be understood that this additional feed ring, i.e. in a way the fourth feed ring, is connected to the charging pumps and feed lines, so that it can be put into operation on very short notice when needed. This enables a transition from one binder to another almost without any downtime.

In order to prevent the formation of disadvantageous product drips at the nozzles for the binder, in particular for the starch, the invention provides that the nozzles at the feed ring for the starch and silicone are covered, in contrast to the nozzles on the feed ring for the water, thus preventing the cooling effect which in the past occurred at the nozzles and caused the starch to already cool down prior to exiting the nozzle and thus resulted in the described disadvantageous product drips. When covering them, in contrast to the water nozzles, the starch nozzle remains unaffected by temperature, and the starch can be sprayed safely on the glass fibers flowing past.

The invention is in particular characterized in that it creates a process and a plant, with which glass fibers can be produced as in the past, and are then sprayed with an environmentally friendly, yet very safe and also cheap binder. The process and the plant in this way ensure a uniform spraying even in continuous operation, so that hereby mats or plates with practically any desired volume density can be obtained. These plates and mats are advantageously suited for processing into insulating material for different fields, e.g. for interior construction, whereby these products are both hydrophobic and flame-retardant. This ensures that at least the application field of the products previously bound with phenol resin can be supplied with this new product. But due to the environmentally friendly construction, it is, however, also possible that these mats and plates are used in former problem areas, e.g. as insulating mats in stoves and ovens, where in the past the temperature could cause a gassing out, especially of the phenol esters contained in the mats. These mats and plates are also suitable for adsorbing oil and petroleum-like products, and thus can be used as adsorbers, e.g. for fighting environmental oil disasters.

Other details and advantages of the subject of the invention result from the following description of the associated drawing, which shows a preferred embodiment with the necessary details and parts.

DETAILED DESCRIPTION OF THE PREFERRED EMBODIMENTS

Figure 1:
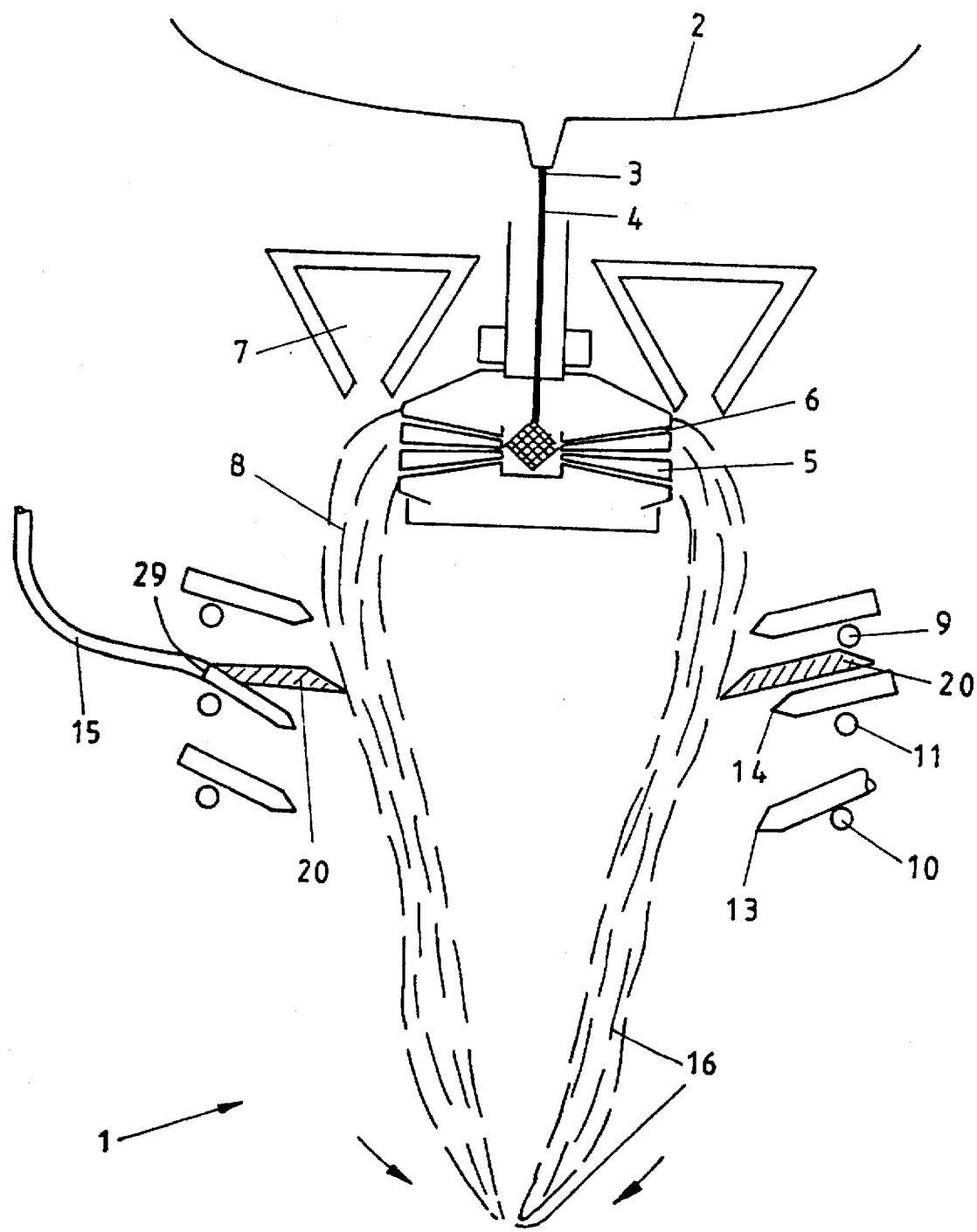
FIG. 1 shows a schematic illustration of a plant for producing glass fibers.

FIG. 1 first shows a glass melter in which the glass for the plant 1 is molten. 2 stands for the liquid glass container, from which the liquid glass can exit through an outlet opening 3 in the form of a uniform glass jet 4.

This glass jet reaches a turn table 5 which is provided at its outer rim with openings 6. The liquid glass is pressed via the revolving turntable 5 through the openings 6 and leaves the turntable as a single fiber, whereby the necessary temperature in this part is provided by the gas burner 7.

At a distance from the feed ring 9, another feed ring 10 is provided, through which the binder component silicone is sprayed onto the glass fibers 8. Close behind it is the feed ring 11, through which the binder component starch is sprayed on. The individual feed rings 10, 11 are equipped with nozzles 13, 14, through which the respective binder component can be uniformly discharged, whereby the nozzles 14 have a larger diameter than the nozzles 13 in order to ensure a uniform discharge of the binder component starch.

Figure 3:
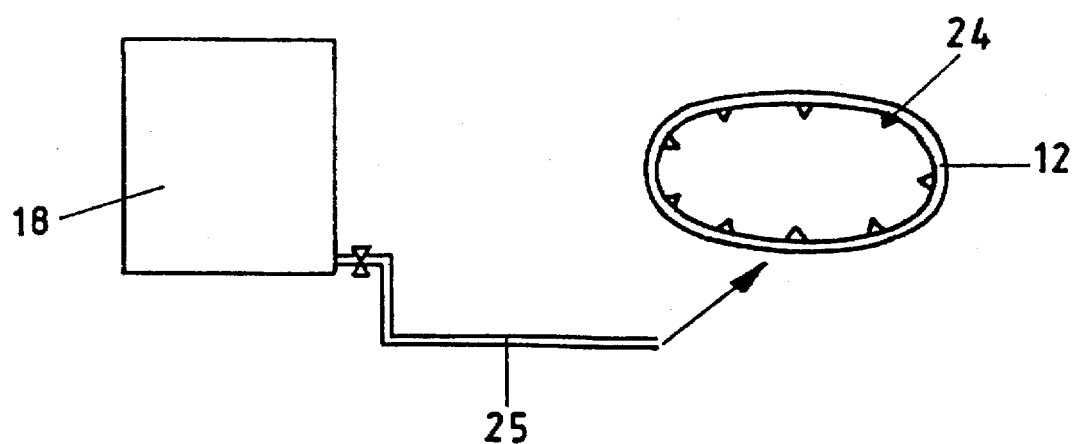
FIG. 3 shows a container for resin.

Behind the feed rings 9, 10, 11, another feed ring 12 can be provided, as is indicated in FIG. 3, through which a binder mixture of vinyl resin and silicone is sprayed on.

FIG. 1 shows an arrangement in which the feed ring 11 for the starch is arranged between the feed ring 9 for the water and the feed ring 10 for the silicone, whereby the feed ring 11 is provided with a cover 20 in order to prevent the nozzles 14 from being influenced by the sprayed-on water. 15 stands for a feed line, through which the starch is sprayed onto the glass fiber mat 16 in this case.

More correctly, this is, however, not yet the glass fiber mat 16, but rather the individual glass fibers 8 which are only combined into glass fiber mats 16 after the spraying with the binder and are then fed into a drying oven which is not shown here.

Figure 2:
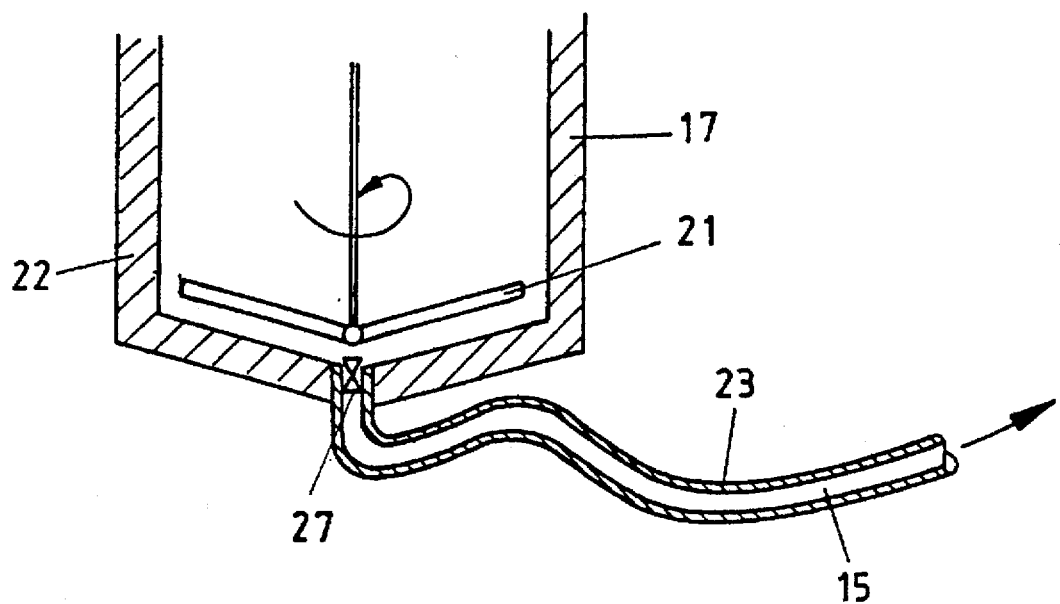
FIG. 2 shows a section of a premixing container.

The feed line 15 is connected to the premixing container 17, which according to FIG. 2 has a special design in order to ensure that the binder component starch can be kept at an even temperature of approximately 50° to 60° C., so that it is fed at this temperature through the feed line 15, which according to FIG. 2 is at least insulated, to the nozzles 14.

The premixing container 17 is provided with a mixer 21 for keeping the starch moving and thus preventing formation of disadvantageous lumps. The wall of the premixing container may contain installed heating pipes 22 in order to bring about a heating of the starch or maintain the respective temperature. The temperature can be accurately set and maintained with thermometers.

FIG. 2 shows another embodiment to the extent that here the feed line 15 is provided additionally with a heating coil 23, so that in this way the starch can also be heated, or its uniform temperature can be maintained during its transport to the nozzles 14. As seen in FIG. 2, sieve 27 with openings is positioned between the container 22 and the feed line 15. As seen in FIG. 1, a hydrometer 29 may be provided in the feed line 15 before the feed ring 11.

The emulsion is preferably prepared from silicone resin, silicone oil, a dust binder and starch. The process includes atomizing the emulsion at a temperature of 18 to 200 degrees Celsius and spraying the emulsion onto the glass fibers.

Preferably, silane is mixed as a catalyst into the emulsion and the starch partially replaced with a material selected from the substances such as epoxy, methylon and polyester resin.

The silicone may be added to the emulsion at 0.5 to 4 weight percent and the material added to the emulsion at 3 to 7 weight percent.

FIG. 3 finally shows a container 18 in which vinyl resin or a binder of vinyl resin and silicone are kept. This binder, as described above, is sprayed through feed line 25 and another feed ring 12 onto the glass fibers 8, whereby nozzles 24 are arranged or distributed over the circumference of the additional feed ring 12.

Figure 4:
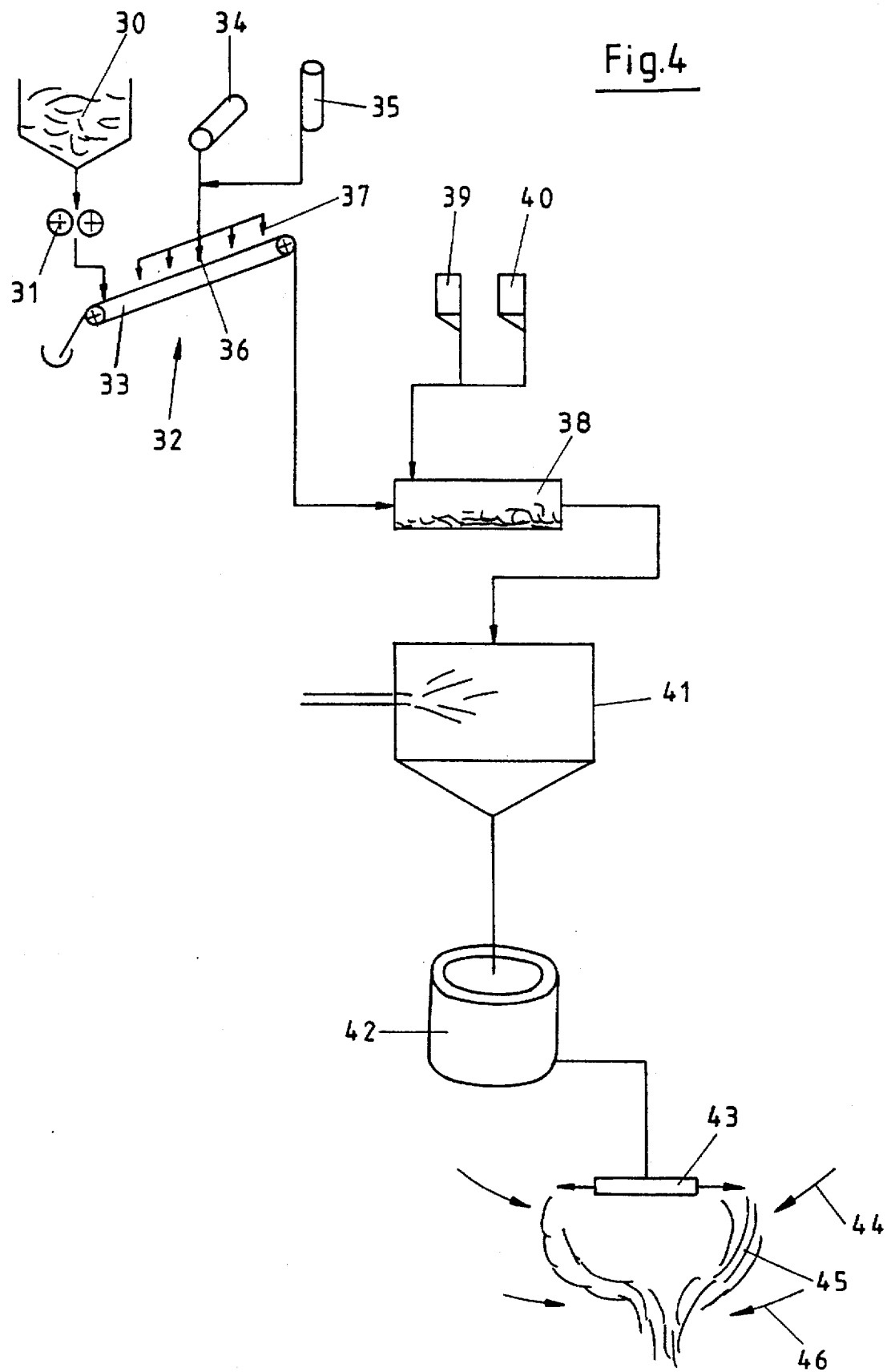
FIG. 4 shows a plant for producing corresponding glass fibers of completely or partially recycled glass.

FIG. 4 explains the overall process, whereby 30 stands for the glass collection container in which the old glass is collected depending on its type of origin or structure. Metallic parts have already been separated, so that a more or less soiled glass material is present here.

This glass material is first fed to a comminution aggregate 31, and is then transferred to a washing system 32 or corresponding belt 33. This slowly moving belt carries the glass material below a kind of shower system, which is supplied by a water distribution system 34 with the necessary cleaning water. Different chemicals can be added to this cleaning water, for which purpose the solvent tank 35 has been provided. Instead of this solvent tank 35, solid chemicals can be provided. The chemicals are mixed with the water and are then sprayed through nozzles 36, 37 onto the product to be cleaned. The washing water is collected in a trough and is treated so that it can be recycled.

After the cleaning process has concluded, the material reaches a mill 38 where it is ground to the necessary grain size. At the same time, the necessary additive is added in the mill 38, whereby in this case the additive is kept in corresponding hoppers 39, 40 for the additives.

After the mixing and comminution process is concluded, the glass dust or the old glass material is nozzled into the glass melter 41. The glass material is melted at 800° to 1,000° C. by the flames, so that the liquid glass can then be fed into an intermediate container 42 where it is kept at this temperature until it can be further processed.

For the further processing, a turntable 43, on which the liquid glass jet impacts, is provided here. The glass material is then pressed outward through the nozzles provided in the turntable 43, so that thin glass fibers and thus a glass wool 45 is produced.

The gas burner 44 hereby maintains an appropriate temperature, so that the emulsion of primarily epoxy resin and silicone resin which was described above can even be applied to the individual glass fibers 3, 4 through the binder feeder 46. Other details regarding the further processing have been shown and explained in reference to FIG. 1.

The overall process can also be called the "Schiwi Process," whereby this process, by way of a complete treatment of old, even low quality glass, ensures high quality end products.

All mentioned characteristics, including those found only in the drawings, are considered to be essential to the invention, both by themselves or in combination.

I claim:

1. A process for manufacturing glass fibers from sand, recycled glass and additives comprising providing a glass material mixture, melting the mixture into liquid glass, forming glass fibers from the liquid glass by pressing the liquid glass through openings in a turn table, spraying water on the glass fibers, spraying a binder on the glass fibers, and shaping the glass fibers under pressure into a mat structure, wherein the binder is a mixture of starch and silicone, wherein the binder is about 6 to 8 weight percent related to the glass fibers, wherein the starch is a long-chain starch, wherein the starch is heated to a temperature of 50 to 60 degrees Celsius, kept at the temperature and stirred until sprayed, and wherein spraying the binder further comprises spraying the silicone and spraying the starch onto the glass fibers simultaneously through separate nozzles.

2. The process of claim 1, wherein the starch and the silicone are sprayed onto the glass fibers in a ratio of 94 to 96 percent starch and 6 to 4 percent silicone, and wherein the binder is 6.5 weight percent related to the glass fibers.

3. The process of claim 1, further comprising producing emulsion from silicone resin, silicone oil, a dust binder and starch, atomizing the emulsion at a temperature of 18 to 200 degrees Celsius and spraying the emulsion onto the glass fibers.

4. The process of claim 3, further comprising mixing silane as a catalyst into the emulsion and partially replacing the starch with a material selected from the group consisting of epoxy, methylon and polyester resin, and wherein the silicone is added to the emulsion at 0.5 to 4 weight percent and the material is added to the emulsion at 3 to 7 weight percent.

5. The process of claim 1, further comprising applying a thin glass fleece or bands of woven glass fibers to the structure.

6. The process of claim 1, wherein providing a glass material mixture further comprises removing foreign substances from the mixture, comminuting the mixture without sorting, and adding additives to the mixture, and wherein melting the mixture further comprises heating the mixture to a temperature of 800 to 1000 degrees Celsius.

7. An apparatus for manufacturing glass fibers comprising a liquid glass container having an outlet opening, a turn table having openings and positioned for receiving liquid glass from the container, a gas burner positioned for maintaining appropriate temperatures of glass fibers exiting the turn table, feed rings followed by nozzles positioned for directing water and binder onto the glass fibers, and a container connected to one of the feed rings for premixing one of the binder components, wherein the feed rings further comprise a first feed ring for spraying starch or resin onto the glass fibers, and a second feed ring for spraying silicone onto the glass fibers, wherein the nozzles of the first feed ring have enlarged nozzle openings and tear-off edges, wherein the container for premixing one of the binder components is heatable, and wherein a feed line extending from the container to the nozzles of the first feed ring is heat insulating.

8. The apparatus of claim 7, further comprising a sieve having openings adapted to the nozzles of the first feed ring, wherein the sieve is positioned between the container and the feed line, and a hydrometer provided in the feed line before the first feed ring.

9. The apparatus of claim 7, wherein the feed rings further comprise a third feed ring associated with the turn table for delivering epoxy resin or vinyl resin to the glass fibers, and wherein the third feed ring has nozzles having outlet cross-sections smaller than outlet cross-sections of the nozzles of the second feed ring.

10. The apparatus of claim 7, wherein the feed rings comprise a water feed ring, and wherein the nozzles of the first feed ring and the second feed ring are covered and the nozzles of the water feed ring are uncovered.

* * * * *